T. H. DISERENS & F. C. McKAY.
BOLL WEEVIL DESTROYING MACHINE.
APPLICATION FILED JAN. 22, 1917.

1,263,312.

Patented Apr. 16, 1918.
3 SHEETS—SHEET 1.

INVENTORS
Thomas H. Diserens.
Frank C. McKay
BY
ATTORNEY

UNITED STATES PATENT OFFICE.

THOMAS H. DISERENS, OF DALLAS, AND FRANK C. McKAY, OF CELINA, TEXAS.

BOLL-WEEVIL-DESTROYING MACHINE.

1,263,312.   Specification of Letters Patent.   Patented Apr. 16, 1918.

Application filed January 22, 1917. Serial No. 143,867.

*To all whom it may concern:*

Be it known that we, THOMAS H. DISERENS and FRANK C. McKAY, the one of Dallas, county of Dallas, and State of Texas, and the other of Celina, county of Collin, and State of Texas, both being citizens of the United States of America, have invented certain new and useful Improvements in Boll-Weevil-Destroying Machines, of which the following is a specification.

This invention relates to a new and useful improvement in an insect destroyer, and especially relates and appertains to a particular form of machine for destroying boll weevil and other pests which frequent and infect agricultural products and especially the cotton growth of the land.

A purpose of the invention is to provide a certain effective system of catching the insects, larva, worms, boll weevils and all destructive pests of the cotton and convey them through the machine to a certain destroyer or grinder which grinds and mutilates the insects, and precipitates the said destroyed animal life back upon the ground.

A further purpose of the invention is to combine a plurality of suction nozzles correlated with a common suction system adaptable to sweep a plurality of rows at a time catching and gathering up the insect life which thrives upon the plant life to be cleaned and subjected to the action of the machine, an example of which is disclosed herein and comprises the principle of this invention. A still further purpose of this invention is to provide a certain agitating or shaking element to loose and precipitate from the plants the insect animal life which may thrive upon the said plants.

With the above and other objects in view the invention has relation to a certain combination and arrangement of parts correlated one with the other to accomplish the purposes disclosed, an example of which is given in the following specification illustrated in the accompanying drawings and pointed out in the appended claims.

Figure 1 of the drawings illustrates a partial plan view of the machine, many parts being omitted from said view for a comprehension of the driving transmission incorporated into the machine.

Figure 1:
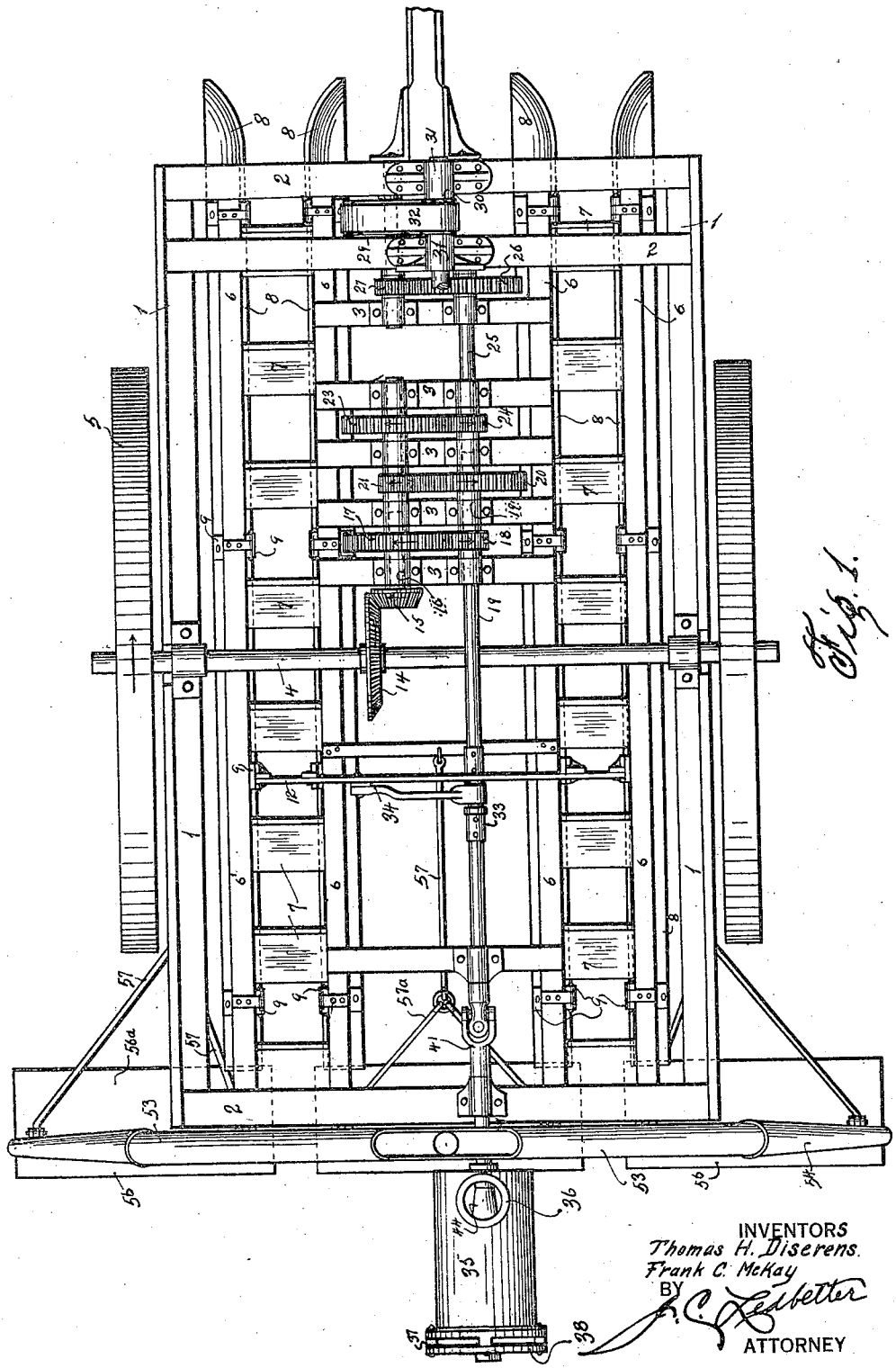
Figure 2:
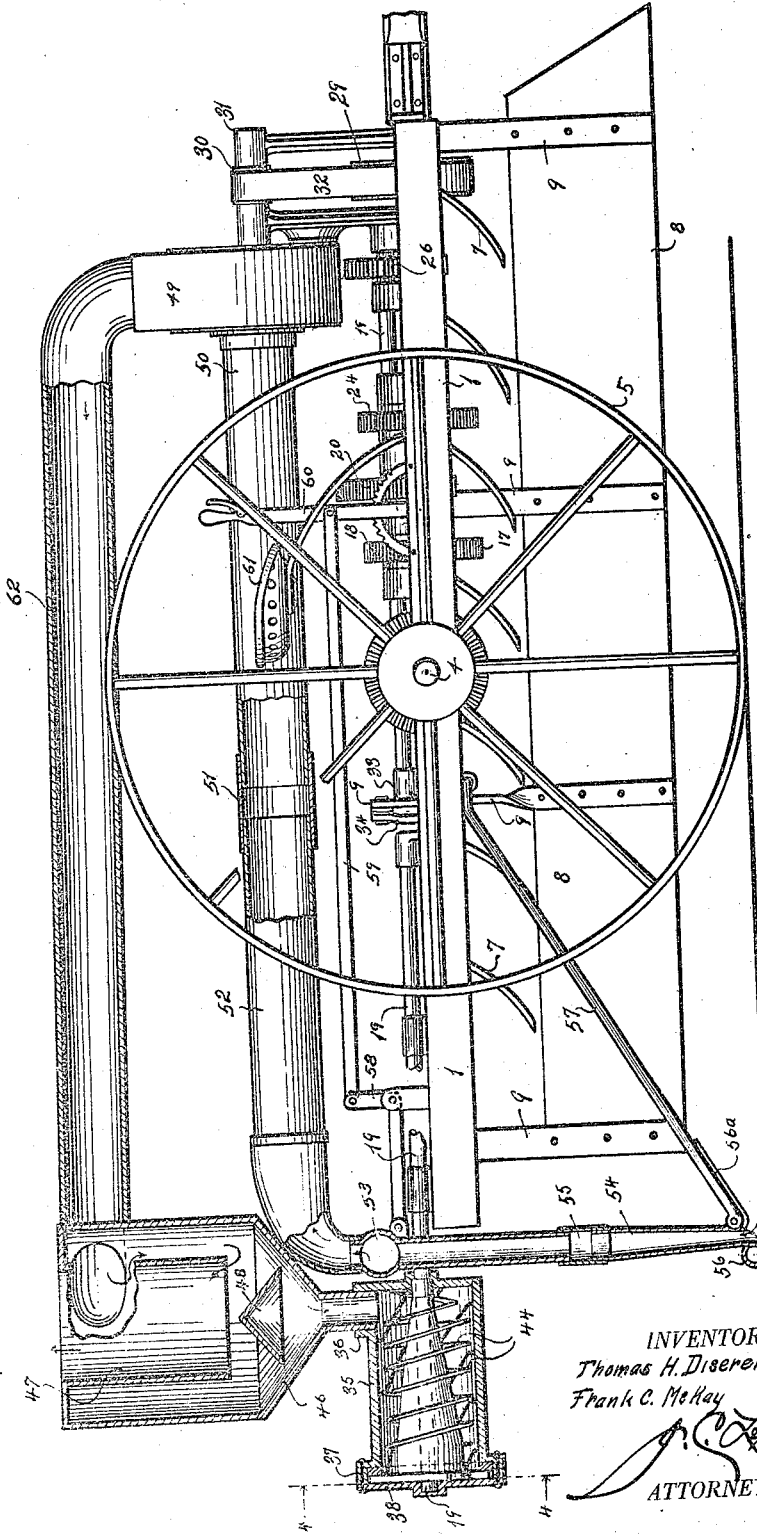
Fig. 2 is a view in side elevation illustrating parts of the machine in section.
Figure 3:
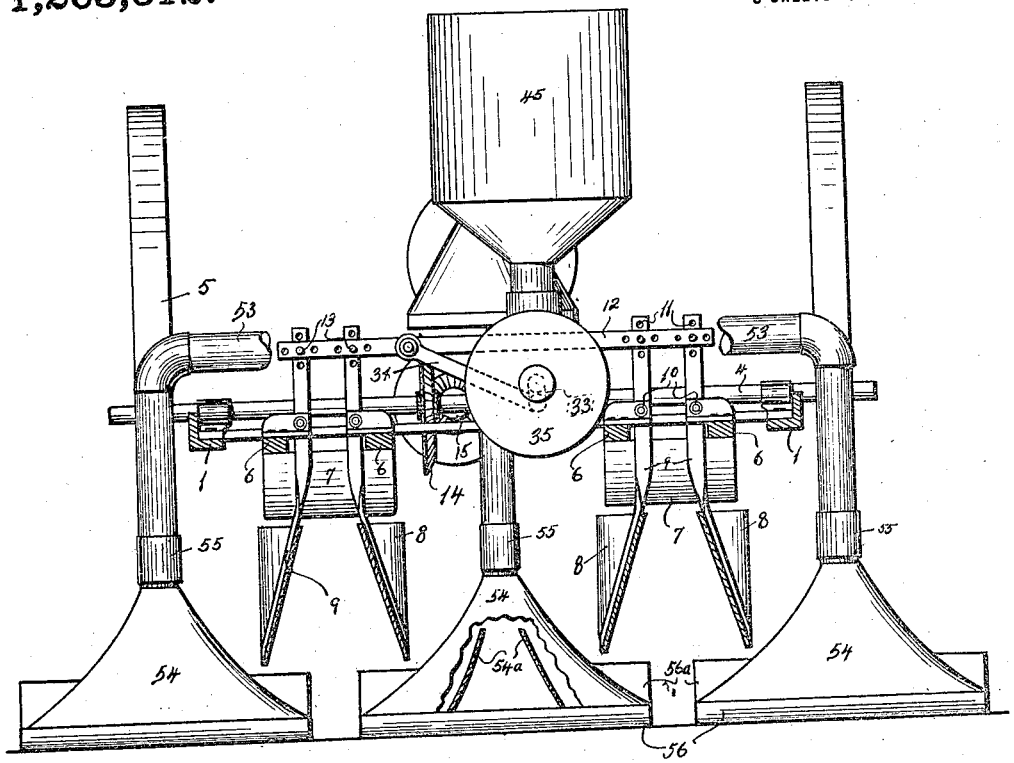
Fig. 3 is a view showing the machine in rear elevation.
Figure 4:
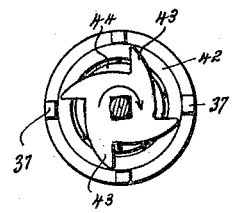
Fig. 4 is an opened end view of a certain grinding and cutting device incorporated into the machine.
Figure 5:
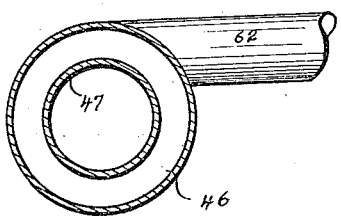
Fig. 5 is a sectional view taken upon the line 5—5 of Fig. 3.

Referring now more particularly to the drawings, wherein the same reference characters are used to indicate the identical parts throughout the several views, the numeral 1 designates the several parallel members primarily constituting the base or frame of said machine. Transverse beams 2 mounted upon and fixed to the frame members 1 space the frame in a desired relation giving rigidity and substantial base assembly. A number of transverse support bars 3 are carried between the inner frame member 1 and are disposed therein in a manner best arranged to mount certain driving transmission as later seen. A main drive shaft 4 is journaled transversely of the frame and carry thereupon a pair of transport traction wheels 5, which wheels are fixed upon said shaft, adapting the shaft to drive the parts hereinafter described.

The form and design of the machine herein disclosed is one example of the varied construction which may be ruled to come within the purview of the claims constituting these Letters Patent, the present drawings disclose a machine adaptable for use in a sweeping operation upon two rows of cotton at a time.

Longitudinal parallel support bars 6 are arranged in pairs on each side of the machine. A plurality of curved shaker or agitator plates or aprons 7 are disposed upon the beams 6 in a position with extremities fixed to said beams and extending transversely of said machine and arranged in a parallel relation thereupon at a distance apart best calculated to give the desired shaking or agitating effect as hereinafter disclosed. The agitator aprons are disposed upon the support bars in an angular relation therewith having their lower free extremities extending rearwardly as illustrated. The agitator members may be curved or straight in form and if desirable constructed of a flexible material adapted to flex, bend or yield under the impulse of the plants or stalks over which they will be adapted to pass. The assembly just described is an arrangement of agitator aprons provided upon the machine for each row of cotton to be treated. A pair of shaker boards 8 are arranged in a depending hinged manner from the frame work of said machine. Links 9, movably suspended from hooks secured to the frame work, are adapted to suspend the members 8 in a movable position. The shaker boards 8 are formed of a length approximately that of the length of the machine and adapted to move in a straight line direction as the travel of the machine progresses along the row. These shaker boards 8 are spaced apart and in parallel relation one with the other and have their lower edges tilted outwardly in a position to best receive and accommodate the foliage and cotton plants, permitting said plants to pass in a close or brushing relation therebetween. Suspension levers 9, pivoted at 10 upon the frame of the machine have their lower extremities fixed to the shaker boards 8 with their upper extremities projecting above the machine and provided with a plurality of holes 11. This assembly of shaker boards 8 in pairs are arranged, one pair upon each side of the machine as illustrated, the construction and arrangement of each pair being identical one with the other. A connecting bar 12 is provided and has a pivotal connection as indicated by the numeral 13 with each upper extremity of the suspension levers. This common connection in joining together of the members 9 correlates the several shaker boards arranged in pairs in a common agitating movement as later shown. The several holes 11 as provided in the upper extremities of the suspension levers and as shown provided in the connecting link 12, are for the purpose of effecting the different and varying adjustments and angular dispositions of the shaker boards, which adjustments in position of the various parts are obtained by any desired shift or change of the pivotal points 13 to the adjacent holes in the correlated members.

A driving gear 14 is fixed upon the main shaft 4 and meshes with a driven pinion 15 fixed upon a shaft 16, journaled in bearings mounted upon the cross members 3. A spur gear 17 is fixed upon the shaft common with the gear 15 and adapted to mesh with and drive a gear 18, which in turn is fixed upon a substantially long shaft 19 journaled longitudinally in the frame of the machine. A spur gear 20 is fixed upon the shaft 19 and meshes with and drives a gear 21 which in turn is fixed upon a shaft 22 journaled in bearings supported by the frame. A driving gear 23 is fixed upon the shaft 22 and adapted to mesh with and drive a spur gear 24, which spur gear is fixed upon a shaft 25, which extends toward the front of the machine and is fixed to the extremity thereof. Another gear 26, which in turn drives a spur gear of smaller diameter 27, fixed upon a shaft 28 journaled in the frame, and which shaft 28 is provided with a belt pulley 29 fixed thereupon and adapted to drive from said shaft a driven pulley 30, supported above the frame of the machine on suitable bearings 31. A belt 32 is provided and drives the pulley 31 from the large driving wheel 29.

The shaft 19 is provided with a crank 33. The crank 33 carries a connecting rod 34 which has a pivoted connection with the cross link 12. One of the purposes of the power transmission comprising the train of gears as described is to subject the cross link 12 to a transverse vibrating motion which in turn operates upon the shaker boards 8, subjecting them to a high speed vibration of an amplitude variable through the adjustment of the several parts as heretofore described.

A cylinder 35 is mounted upon the rear portion of the machine and provided with an open receiving spout 36 located near one end. A plurality of lugs 37 are integrally formed on the cylinder at the rear extremity thereof being equi-distantly spaced apart. A circular plate 38 solid in construction is provided on the rear end of the cylinder. The plate 38 is spaced slightly apart from the rear extremity of the cylinder and attached to the lugs by bolts or screws. The shaft 19 extends rearwardly of the machine and is journaled within bearings integrally formed in the extremity of the cylinder and the plate 38. A universal joint 41 may be interposed in the shaft 19 for the purpose of better delivering the power to the rear extremity of the shaft contained within the cylinder.

A ring 42 is provided to fit in a recess formed in the extremity of the cylinder and is preferably formed of steel with edges ground to a perpendicular with the axis of the cylinder and to lie flush and even with the extremity of said cylinder. A knife consisting of a plurality of blades 43 is confined upon a square shoulder of the shaft adapted to revolve therewith in a contiguous cutting relation with the steel ring. The revolving bladed knife with its forward cutting edges revolving against the stationary steel ring forms the cutting element of the present machine, and is adapted to cut into minute particles, mutilating and severing all solid bodies which pass from the cylinder through the slight space formed between the extremity thereof and the plate 38. A screw conveyer 44 is confined in the cylinder and fixed upon the shaft 19, adapted to revolve therewith in a direction progressively toward the rear end of the cylinder and toward the knife, the length of said conveyer screw being slightly less than the inner length dimension of the cylinder, which leaves an open and unobstructed space near the rear end of said cylinder.

The core of the conveyer screw will gradually be increased in its circumference from one end of the screw toward the rear end thereof, which construction will force the substance to be conveyed toward the outer portions of the screw causing same to pass from the end of the conveyer to the shearing blades of the revolving knife. This element of the machine just described comprises a grinding destroyer of the insect life collected as herein later described in operation.

A substantially large funnel shaped separating receiver comprising a cylindrical casing 45 with an integral tapering funnel shaped body 46 opens into the grinding cylinder through the spout 36. The upper portion of the large receiving drum is a closed in structure. A cylinder 47, open at each end, is provided in the receiving drum and forms an opening from said drum to the atmosphere as indicated by the arrows. A baffle plate 48 is provided in the funnel shaped body of the receiving drum leaving a small annular open space between the periphery of the baffle plate and walls of the funnel through which opening is later seen to pass certain substances. A centrifugal exhauster fan 49, confined in the usual form of air tight casing is mounted upon the forward portion of the machine upon a superstructure suitable for support. The pulley 30 under the driving influence of the pulley 29 is adapted to drive the exhauster fan. The inlet or suction side of the exhauster fan is indicated by the numeral 50, which intake conduit has a flexible joint or connection 51, connecting with a suction conduit 52 extending rearwardly from the exhaust fan and curving downwardly toward the ground where said conduit has an open connection with a transverse conduit 53. Fan-shaped suction nozzles 54, three of which are provided on the machine herein disclosed and adapted to sweep or operate upon two rows at a time, have open connection with and depend from the transverse conduit 53. The fan-shaped suction nozzles are provided with a flexible or loose joint 55 which permits them to move about in adjustment. The suction nozzles have on their lower extremity a curl or roll 56 of substantially strong construction which is adapted to lie contiguous with the ground along which the machine travels. The weight of the suction nozzles 54 is supported from the loose joint 55 upon the curl 56, causing the suction nozzles to remain in a close relation to the ground moving over same in a sliding relation therewith. The suction nozzles are constructed in a fan-shaped form and brought to a narrow slit at the bottom thereof which gives a substantially narrow elongated entrance or admission opening to said fan-shaped nozzle. The general contour of the lower portion of the fan-shaped nozzle is arcuate or curved in form to best fit the contour of the ground between the rows to be traveled. The nozzles have several webs or partitions 54$^a$ disposed therein for the purpose of reinforcing them insuring against collapse of the preferably sheet metal walls forming the nozzles. A curved upturned apron 56$^a$ is provided on the forward side of each nozzle for the purpose of concentrating toward the mouth or opening of the nozzle all substances to be picked up. The suction nozzles are spaced slightly apart one from the other of sufficient distance to readily permit the body of the cotton plant to pass therebetween without bruising or injuring same. A number of strut-rods 57 have a flexible connection with the frame and extend downwardly and rearwardly and connect with a pair of rods 57$^a$ which attach to each side of the suction nozzle. This arrangement of strut-rods confines the suction nozzles to their proper position as the machine travels along the row.

A bell-crank 58 is pivoted upon the frame of the machine and has connection with the air duct 53. A link 59 extends forwardly from the bell-crank connecting with the lever 60, conveniently accessible to the driver of the machine from the seat 61. This arrangement of control from the lever 60 permits the operator of the machine to raise and lower the suction nozzles by manipulation of the lever 60, which arrangement is necessary to properly adjust the traveling relation of the suction nozzles to the middle of the rows and their variable form in depth or height.

An outlet duct 62 extends from the fan casing to the upper portion of the separating drum 45 and communicates the exhauster with said member.

In the operation of the machine the transport wheels in their tractive effort drive the several operating parts of the machine at sufficient speed to perform the purposes for which the machine is designed. The high speed revolution of the exhauster fan creates a tremendous suction and draft upwardly from the surface of the ground through the suction nozzles connecting with the air conduit 52, and passing into the receiving drum. This action sweeps, lifts and picks up from the ground all small and light weight objects which it is possible for a suction or draft to act upon. The tremendous agitation and shaking movement set up by the shaker boards 8 acting upon the lateral arranged sides of the cotton plants in conjunction with the agitator aprons knocks and shakes all the boll weevils and destructive insects from the cotton plants upon the ground just in front of the suction nozzles. The suction nozzles sweep and pick up the moving and crawling boll weevil and insects and conveys them into the receiving separator drum where the physical body portions of all matter picked up passes downwardly into the grinding machine and conveyed rearwardly to the revolving knife by the conveyer screw, where all insect life including the boll weevil is cut and mutilated and precipitated to the ground while the air pressure spends its force through the upper open cylinder 47.

The invention is presented to include all such changes and modifications as may come within the meaning of the following claims.

Claims:

1. In a device of the character described, the combination with air suction means, of an air suction nozzle comprising a fan-shaped device provided with an elongated air inlet, an extension formed on the nozzle and extending along the air inlet for the purpose of contacting the ground and preventing the insects from passing the nozzle, an apron arranged ahead of the nozzle for the purpose of directing the insects into the air inlet opening, a flexible joint attached to the nozzle for the purpose of connecting same with the suction means, and braces attached to each side of the nozzle for the purpose of holding it transversely across the middle to be treated.

2. In a device of the character described, the combination with air suction means, an air suction device comprising a fan shaped nozzle provided with a narrow elongated opening formed in the suction end of said nozzle, with a tubular brace extending longitudinally along the working end of the nozzle and at the base and adapted to lie in contact with the ground to prevent the insect from escaping past the air inlet, and an apron arranged forward of the nozzle with a spread suitable for directing the insect into the opening.

In testimony whereof we hereunto affix our signatures in the presence of two witnesses.

THOMAS H. DISERENS.
FRANK C. McKAY.

Witnesses:
J. L. McNees,
J. C. Ledbetter.

Copies of this patent may be obtained for five cents each, by addressing the "Commissioner of Patents, Washington, D. C."